United States Patent
Leoni et al.

(10) Patent No.: US 9,846,874 B2
(45) Date of Patent: Dec. 19, 2017

(54) PERFORMING A USER RELATED OPERATION

(75) Inventors: Napoleon J. Leoni, San Jose, CA (US); Ehud Chatow, Palo Alto, CA (US); Omer Gila, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1187 days.

(21) Appl. No.: 13/455,426

(22) Filed: Apr. 25, 2012

(65) Prior Publication Data

US 2013/0290115 A1    Oct. 31, 2013

(51) Int. Cl.
*G06Q 20/32* (2012.01)
*G07F 7/08* (2006.01)
*G06F 21/34* (2013.01)
*G06F 21/36* (2013.01)

(52) U.S. Cl.
CPC ......... *G06Q 20/3276* (2013.01); *G06F 21/34* (2013.01); *G06F 21/36* (2013.01); *G07F 7/0846* (2013.01)

(58) Field of Classification Search
CPC ............... G06Q 20/20; G06Q 20/3276; G06Q 20/3274; G06F 17/30879; G06F 17/00; G06F 3/065; G06K 19/06028; G06K 7/0004; G06K 15/024; G09F 2003/0211; G07F 7/0893; G07F 7/0873; G07F 7/0886; G06C 20/40145; G06C 20/3674; G06C 20/40; B43L 1/008; H01L 31/0236; H04N 7/0127

See application file for complete search history.

(56) References Cited

U.S. PATENT DOCUMENTS

| | | | | |
|---|---|---|---|---|
| 4,975,948 A | * | 12/1990 | Andresen | H04M 1/2755 379/355.08 |
| 6,002,383 A | * | 12/1999 | Shimada | G06K 1/128 235/380 |
| 7,379,901 B1 | * | 5/2008 | Philyaw | G06Q 20/10 705/17 |
| 9,077,828 B1 | * | 7/2015 | Koster | H04M 3/5231 |
| 2003/0126098 A1 | * | 7/2003 | Hine | G06Q 30/02 705/400 |
| 2004/0046014 A1 | * | 3/2004 | Russell | G06F 17/30879 235/375 |

(Continued)

OTHER PUBLICATIONS

HID, "HID Global Announces the Edge Family of IP-Based Access Control Solutions", "Webpage found at www.hidglobal.com/press-releases/hid-global-announces-edgetm-family-ip-based-access-control-solutions downloaded on Oct. 21, 2013", Mar. 28, 2007, pp. 1, Publisher: HID Global, Published in: US.*

(Continued)

*Primary Examiner* — Mohammad Z Shaikh
*Assistant Examiner* — Mary Gregg
(74) *Attorney, Agent, or Firm* — Fabian VanCott

(57) ABSTRACT

A method of performing a user related operation includes, with an optical reader, reading an encoded on-line address being displayed on a display of a pocket-sized card to be carried by a user; decoding the encoded on-line address; requesting access to remotely stored data using the on-line address, the remotely stored data being related to the user; and, upon the requested access being granted, loading the remotely stored data.

20 Claims, 7 Drawing Sheets

(56) References Cited

U.S. PATENT DOCUMENTS

| | | | | |
|---|---|---|---|---|
| 2005/0125343 | A1* | 6/2005 | Mendelovich | G06Q 20/04 705/39 |
| 2005/0278230 | A1* | 12/2005 | Shirasaka | G06Q 30/02 705/26.1 |
| 2006/0059365 | A1* | 3/2006 | Harper | G06F 19/323 713/186 |
| 2006/0180805 | A1* | 8/2006 | Lutz | H01L 27/283 257/40 |
| 2009/0172780 | A1* | 7/2009 | Sukeda | H04N 7/17318 726/3 |
| 2010/0150352 | A1* | 6/2010 | Mansour | H04L 9/003 380/281 |
| 2010/0257254 | A1* | 10/2010 | Bhatnagar | G06Q 20/0457 709/219 |
| 2011/0047019 | A1* | 2/2011 | Cervenka | G06Q 20/20 705/14.26 |
| 2011/0101111 | A1* | 5/2011 | Roncari | B42D 15/0053 235/492 |
| 2011/0246232 | A1* | 10/2011 | Starko | G06F 19/328 705/3 |
| 2012/0035943 | A1* | 2/2012 | Araghi | G06Q 30/06 705/1.1 |
| 2012/0091205 | A1* | 4/2012 | Khorsheed | G06K 7/14 235/462.11 |
| 2012/0273576 | A1* | 11/2012 | Tomczyk | B32B 27/08 235/488 |

OTHER PUBLICATIONS

"Credit Card with Elnk Display Keep You Safe While Online Shopping", Jun. 27, 2011, http://www.youtube.com/watch?v=OdeH4wjuOTA.

"How to Use Smart Phone Apps to Read QR Codes—Social Media Minute", Jun. 21, 2011, http://www.youtube.com/watch?v=FpVbXTuOJNI.

C. Davies, "Mastercard Trialling Smart Credit Cards with Display & Keypads", Jun. 10, 2010, http://www.slashgear.com/mastercard-trialling-smart-credit-cards-with-display-keypads.

\* cited by examiner

PERFORMING A USER RELATED OPERATION

BACKGROUND

Remote data storage devices provide computing services to individuals without requiring the individual to store information on their own electronic devices. The services are provided on the remote device, and a user accesses the device to make use of the service. Examples of remote data storage devices include websites, digital servers, and computer workstations. These devices may also store uploaded information. For example, a user of a remote data storage device, such as a website server, may store personalized information such as pictures and videos to the website. Because it is stored on a remote site, the user may then access the information from any location through an electronic device. Examples of electronic devices include, but are not limited to desktop computers, laptop computers, smart phones, tablets, and other personal computing devices.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
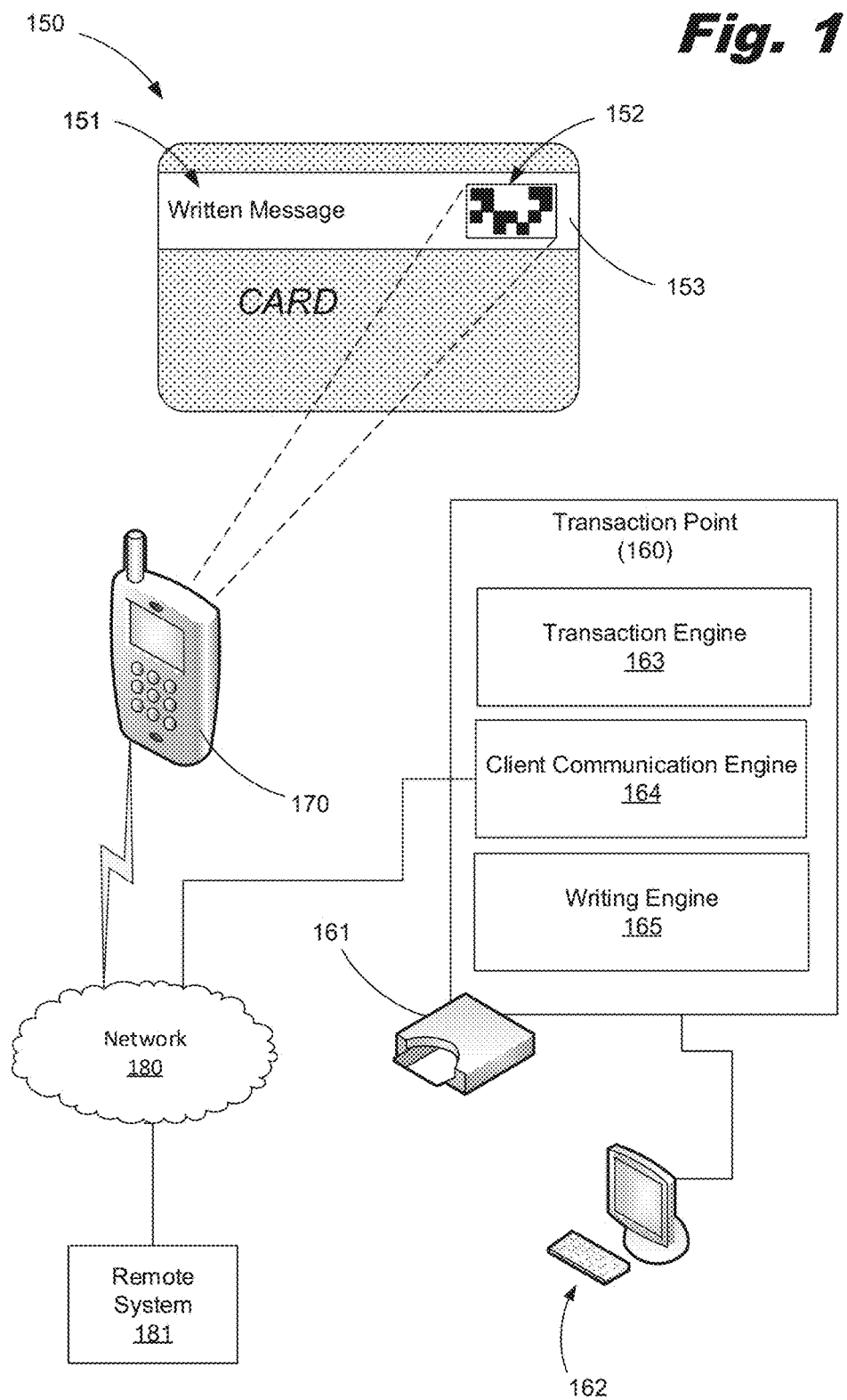
FIG. 1 is a diagram of a system for storing and accessing data located on a remote storage system, according to principles described herein.

The average person carries a number of cards with them on a daily basis, such as credit cards, identification cards, security cards, customer loyalty cards, gift cards and many others. These cards often have a magnetic strip on which machine-readable information can be stored. This might be information about the user of the card or other information, such as the value of the card, an identification number or the other information.

These cards are referred to herein as cards that are pocket-sized or sized to be carried by a user. This refers to cards, for example, that a user carries on a daily basis that are sized to fit in a wallet, purse or pocket and distinguished from any other type of card that is not typically carried by a user.

It is now possible to include a display device on such cards. This display device may be, for example, an electronic paper display device. Electronic paper is a display technology designed to recreate the appearance of ink on ordinary paper. An electronic paper display reflects light like ordinary paper and may be capable of displaying text and images indefinitely without using electricity to refresh the image.

An image can be written to an electronic paper display by generating an electric field that corresponds to the desired image. The electric field attracts or repels charged pigment particles in microcapsules of the electronic paper display to create the desired image. The pigment particles are then stable within the microcapsules after they are moved into a desired position.

An active electronic paper display includes writing circuitry for producing the electric fields that change the image on the display. A passive electronic paper display does not including any such circuitry. Thus, the image on a passive electronic paper display device is changed using a separate writing device that applies the electric field to create the desired image.

There are a host of applications that can benefit from having a display device capable of changeably displaying different images on a card sized to be carried by a user. For example, information about the user or use of the card can be displayed on the card and updated whenever needed.

However, this may pose security concerns as any such information written to the display on the card will be readable by anyone who comes into contact with the card. The user may appreciate having additional information displayed on the card, but may not want that information viewed by other who might handle the card, such as cashiers. Additionally, if the card is lost, the information displayed thereon, which may be confidential, will be available to anyone who finds the card.

Consequently, the present specification describes methods and systems for associating information with a card that is sized to be carried by a user and includes a display device, while also securing that information against casual or malicious observation by others. According to principles described herein, the display device on the card is used to display an encoded on-line address. This encoded address may take the form of a bar code, a matrix bar code or any other image that incorporates an encoded version of the on-line address. The encoded address is used to access a remote system where useful information about the user and/or the card is stored. The information on this remote system may be secured by a password or other security measure to prevent unauthorized access. In this way, the user or an attendant at a transaction point being used by the user can have access to additional information about the user or the card in a manner that is controlled by the user. These and other principles will be described in further detail below.

As used in the present specification and in the appended claims, the term "user" refers to the subject of personalized information located on a remote storage system that is referenced by an encoded address on a display on a card sized to be carried by the user. The user may be an individual entity or a number of individual entities. For example, a user may be a single person accessing information on the remote storage system pertaining to that single person. A user may also be a group of people accessing information on the remote storage system that pertains to the group generally.

In the following description, for purposes of explanation, numerous specific details are set forth in order to provide a thorough understanding of the present systems and methods.

It will be apparent, however, to one skilled in the art that the present apparatus, systems and methods may be practiced without these specific details. Reference in the specification to "an example" or similar language indicates that a particular feature, structure, or characteristic described in connection with the example is included in at least that one example, but not necessarily in other examples. The various instances of the phrase "in one example" or similar phrases in various places in the specification are not necessarily all referring to the same example.

Referring now to the figures, FIG. 1 illustrates various principles of the present specification. As shown in FIG. 1, a card (150) is of the size to be carried by a user. The card (150) may be, for example, any of a credit or debit card, an identification card, a customer loyalty card, a gift card, a club card or similar card. In some examples, the card (150) may include a magnetic strip for storing information on the card.

The card (150) includes a display device (153). The display device (150) may be, for example, an electronic paper display. To minimize the size and expense of the card, the card (150), the display may be a passive electronic paper display.

As shown in FIG. 1, the display device (153) may be controlled to include a written message (151) that is legible to anyone handling the card (150). Various applications for such a written message (151) will be described in following examples.

The display device (153) may also be controlled to display an encoded on-line address (152). As noted above, this encoded on-line address may be, for example, a bar code, a matrix bar code, an image incorporating a bar or matrix bar code, or any other image or text that encodes an on-line address such that the on-line address is readable by a machine, as described herein. As used herein, the term "encoded" denotes that the on-line address has been coded into a machine-readable form and is not presented in a written language that would be readily understandable to a literate human being.

A mobile computing device (170), such as mobile phone or smart phone or a tablet or laptop computer, generally includes an optical device, such as a camera. Consequently, such mobile computing devices (170) are often used to take pictures or video.

As shown in FIG. 1, the mobile computing device (170) which, in this example, is a phone with an optical device may also be programmed to use the encoded on-line address (152) on the card (150). While a phone is shown in this example, it will be understood that any mobile computing device may be used under the principles described herein.

Returning to FIG. 1, the optical device of the phone (170) is used to take a picture of the encoded on-line address (152). As will be described in more detail below, the phone (170) is programmed, for example, with an installed app, to decode the on-line address from the picture of the encoded address (152).

Mobile phones (170) frequently have a wireless connection to a network (180) such as the Internet. This connection may be through the infrastructure of the mobile phone service provider associated with the phone (170). Consequently, once the phone (170) has decoded the on-line address from the card (150), the phone (170) can use the network to contact a remote system (181) at that on-line address.

The remote system (181) can store any variety of information about the user of the card (150) or the card (150) itself. For example, the remote system (181) may store personal or financial details about the user of the card (150). The remote system (181) may store financial records about the usage and value of the card (150). The remote system (181) may store a purchasing history of the card (150) or user. The remote system (181) may store medical history and records of the user of the card (150). There is no limit on the information the remote system (181) may store regarding the user of the card or the card itself.

The remote system (181) may require a password with or without other credentials before any information is made accessible. In some instances, the on-line address itself may identify to the remote system (181) which records related to the user or card. In other examples, the on-line address may only provide contact with the remote system (181) such that a user name or other identifier and password must then be input to access information stored relative to the card (150) or its user. Any other security measures, such as security questions, text recognition and input, or biometric information may be requested in addition or alternative to a password to gain access to the data on the remote system (181).

Thus, for example, the user of the card (150) may wish to access additional information beyond what is included in the written message (151). In such a case, the user (150) can employ a smartphone (170) to read and decode the encoded on-line address (152). Using the smartphone (170), the user then contacts the remote system (181) and provides a password and any other needed credentials. The remote system (181) then transmits to the smartphone (170) information relative to the card (150) or its user. This transmission may be secured using encryption, such as a Secure Socket Layer (SSL), as is commonly done with sensitive Internet traffic, or other security measures to prevent interception on the network (180).

FIG. 1 also illustrates how the card (150) might be used at a transaction point (160). The transaction point (160) is a location at which the user of the card (150) wants to engage in some transaction associated with the card (150). Such a transaction might include, for example, making a purchase, filling a prescription, participating in a loyalty program under which a business rewards customer loyalty, or any other transaction.

In most any situation, a transaction may be facilitated by additional information about the card or the user. Such additional information may include, for example, the user's purchasing history or available credit or funds, the user's loyalty account, a medical history or prescription for the user, etc.

As shown in FIG. 1, the user may present the card (150) at the transaction point (160). A reader (161) including an optical device is provided at the transaction point. The card (150) can be inserted in the reader (161) so that the encoded on-line address (152) on the card is imaged by the reader (161). A client communication engine (164) is programmed to decode the on-line address and contact the remote system (181) via the network (180). This network (181) may be the same or a different network than that used by the smartphone (170) or any other transaction point.

Once contact with the remote system (181) is established, the user may be asked to enter a password or other credentials to allow full or partial access to the relevant information on the remote system (181). This may be done through a terminal (162) at the transaction point.

In this way, the user can provide access to the secured information on the remote system (181) without giving continued access to that information at a later time. With terminal (162), the user may instruct the remote system (181) to provide only specific types or pieces of information to the transaction point (160) and to sever the communication and not again provide any further information until the user's security credentials are again entered.

Once the secured information for the limited purpose of the transaction at hand is received by the client communication engine (164), that information can be provided to a transaction engine (163) of the transaction point (160). The transaction engine (163) then conducts the desired transaction, whatever that might be.

The transaction point (160) may also include a writing engine (165). The writing engine (165) can be used to control the reader (161) which may also include a writing device for changing the image displayed on the card (150). In the example of a passive electronic paper display on the card (150), the writing engine (165) may control an ion beam or other electric field generator in the reader (161) to change the image displayed on the card (150).

The writing engine (165) may update the written message (151) on the card to provide new information to the card user. Examples of this will be given below. Alternatively, if authorized, the writing engine (165) may change the encoded on-line address (152) to update the access to the remote system (181).

Figure 2:
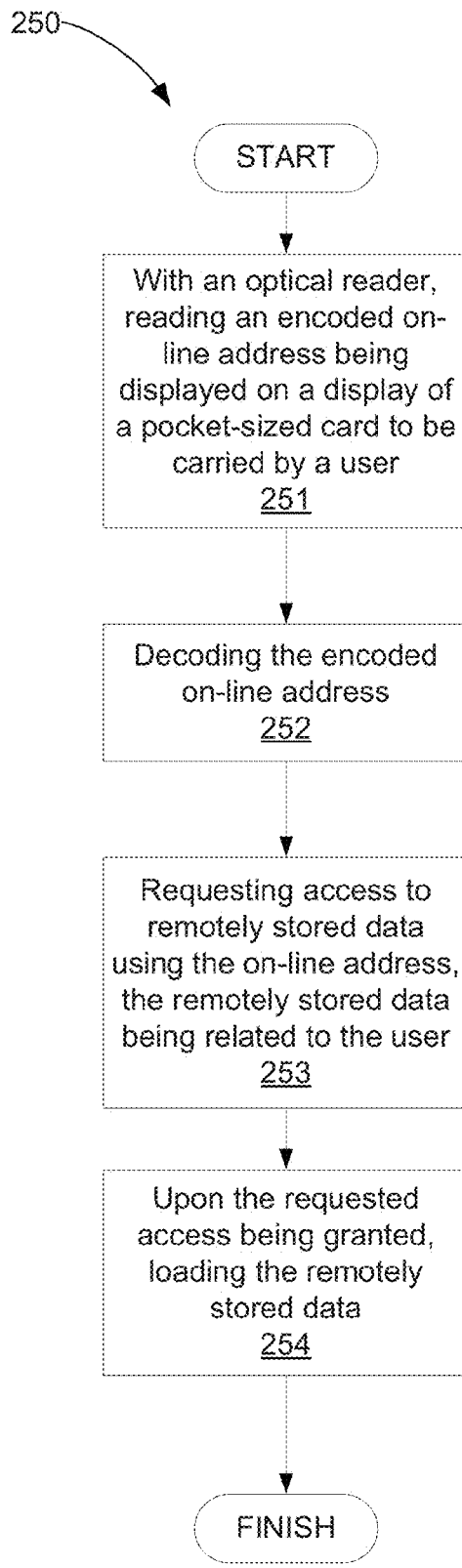
FIG. 2 is a flowchart is a flowchart showing a method for storing and accessing data located on a remote storage system, according to principles described herein.

FIG. 2 is a flowchart illustrating one example of a method (250) of using the card (150) described above in connection with FIG. 1. As shown in FIG. 2, the method (250) begins by, with an optical reader, reading an encoded on-line address being displayed on a display of a pocket-sized card to be carried by a user (251). After the encoded on-line address has been optical read or imaged, the method (250) includes decoding the encoded on-line address (252). The method (250) continues with requesting access to remotely stored data using the on-line address (253). As described above, the remotely stored data relates to the user or, more specifically, to the card carried by the user. Upon the requested access being granted, the method (250) concludes with loading the remotely stored data (254).

Another example of this subject matter is implementing the method (250) in a computer software product including a tangible medium readable by a processor that has stored thereon a set of instructions for causing a mobile computing device, such as a smartphone as described above, to securely access remotely stored data. In this example, the instructions of the computer software produce including (a) a set of instructions which, when loaded into a memory and executed by the processor, causes the mobile computing device to optically read an encoded on-line address being displayed on a variable display of a card sized to be carried by a user; (b) a set of instructions which, when loaded into a memory and executed by the processor, causes the mobile computing device to decode the encoded on-line address and request access to the remotely stored data using the on-line address; and (c) a set of instructions which, when loaded into a memory and executed by the processor, causes the mobile computing device to, upon the requested access being granted, load the remotely stored data.

Figure 3:
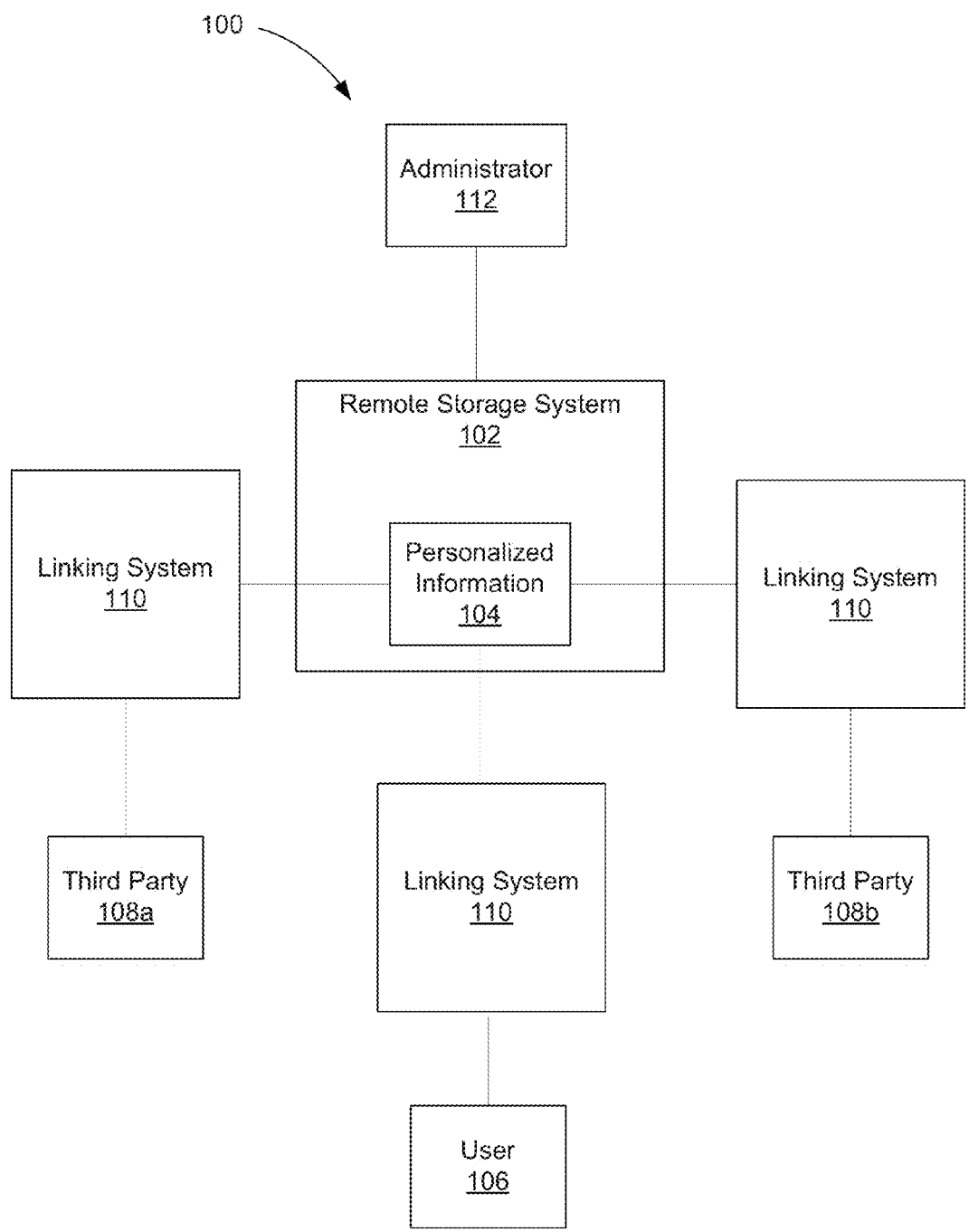
FIG. 3 is a diagram of a system for storing and accessing data located on a remote storage system, according to principles described herein.

As will be appreciated, the principles described herein may have other applications in a variety of circumstances beyond or different from those described with regard to FIGS. 1 and 2. Consequently, FIG. 3 is a diagram of another illustrative system (100) for electronically storing and accessing information according to the principles described herein. FIG. 3 focuses on one possible example of the structure and operation of a remote system (181) such as that described above in connection with FIG. 1

Accordingly, in this example, the system (100) centers on a remote information storage system (102). Examples of such a remote storage system (102, 181) include, but are not limited to, computers, network servers, and websites. Using a number of electronic devices, entities that have been granted access to the remote storage system (102) may access that portion of the remote storage system (102) where the information is stored. Entities may do this through a network and a networked electronic device wherever that device is located. Examples of such electronic devices include, but are not limited to, desktop computers, laptops, smart phones, personal computing devices, and tablets.

In general, the remote storage system (102) can store information that, for convenience or security reasons, is not kept on, for example, the card (150, FIG. 1) or other device of the user. Thus, using a remote storage device (102) provides security and may reduce the duplication of information that need not be stored on multiple electronic devices, i.e., an individual's electronic device and various third party electronic devices. With a reduction of duplication of information, security is increased as a single entity regulates access to the information.

As indicated, the system (100) handles personalized information (104) pertaining to a user, which information is stored on the remote storage system (102). Examples of personalized information (104) include, but are not limited to account numbers, contact information, personal details, medical records of the user, monetary balances on a user's credit or gift card, building access limitations imposed on the user, etc. Such information may be updated as desired.

In some examples, the personalized information (104) may pertain to a single user, for example, a medication prescription for an individual. In other examples, the personalized information (104) may pertain to a group of users, for example, a retailer coupon offered to customers on a subscription list. As explained below, the personalized information (104) may be accessed by the user (106) that it pertains to, an entity in a transaction with the user and other selected third parties (108).

For example, the personalized information (104) may include a medical prescription. In this example, either the user (106) or a third party (108a, 108b), for instance, a doctor or a pharmacist, may access the personalized information (104) to create or read the prescription.

In another example, the personalized information (104) may be a retailer coupon for customers on a subscription list. In this example, the customers of the retailer as the user (106) may view the coupon. Selected third parties (108a, 108b), for instance, the retailer management and retail store, may also access and view the coupon and apply it to a customer's purchase.

The personalized information (104) may be encrypted or encoded upon upload to the remote storage device (102). Accordingly, as the personalized information (104) is accessed by the user (106) and third parties (108), it may be decoded or decrypted so that it can be viewed.

Within the system (100) different entities may have different use rights regarding the personalized information (104). For example, an individual user (106) and one third party (108a) may have access to view the personalized information (104). In the illustrated example, another third party (108b) may also have access to view the personalized information (104) and write or alter the personalized information. While FIG. 3, depicts one user (106) and two third parties (108a, 108b), the system (100) may be comprised of any number of users (106) and third parties (108).

The system (100) may also include an administrator (112) that controls access to the personalized information (104). For example, the administrator (112) may permit the user (106) to see the dollar value of a retailer coupon and may also permit a third-party (108a) retailer location to see the dollar value of the retailer coupon as well as the restrictions or limitations on use of the coupon, for example, a time limitation or quantity limitation on use of the coupon.

The administrator (112) may also indicate the amount of time that personalized information (104) is accessible on the remote storage system (102). For example, a third party retailer management (108b), acting as an administrator, may limit the amount of time that a particular coupon is available to the customer users (106).

The administrator (112) may also impose security measures to ensure that users and third parties not intended to view the personalized information (104) are not granted access. For example, an administrator (112) could insist that a user (106) or third party (108a, 108b) enter a password or other credentials before accessing the personalized information (104). A user or third party that did not enter the password correctly would not be permitted to access the personalized information (104).

In another example, the administrator (112) may limit the internet protocol addresses of electronic devices that may access the information. Allowing the administrator (112) to control access to the personalized information (104) and remote storage system (102) increases the security and confidentiality of the information stored.

While FIG. 3 depicts the administrator (112) as an entity distinct from the third-party (108) and user (106), the third-party (108) or user (106) may act as administrator. For example, a third-party retailer management (108b) may act as the administrator (112) and establish and enforce the security measures.

The system (100) may also include a number of linking systems (110) through which a user (106) and third parties (108a, 108b) obtain access to the personalized information (104). Using the linking systems (110), each party may access the stored personalized information (104) from various location.

Figure 4:
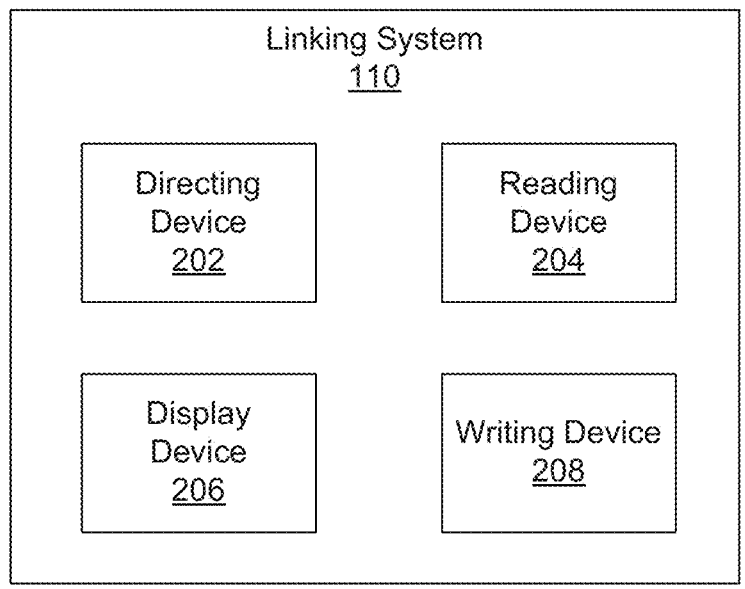
FIG. 4 is a diagram of a linking system for granting access to a remote storage system, according to principles described herein.

FIG. 4 depicts a linking system (110) by which a user (FIG. 3, 106) or third party (FIG. 3, 108a, 108b) may access the personalized information (FIG. 3, 104) located on the remote storage system (FIG. 3, 102). The linking system (110) is the mechanism that allows users and third parties to interact with the personalized information (FIG. 3, 104). For example, through the linking system (110) a user can be directed to the personalized information (FIG. 3, 104), view the personalized information, or write new data to the personalized information file.

According to one example, the linking system (110) may include a directing device (202) that identifies the location of the personalized information (FIG. 3, 104) on the remote storage system. For example, if the remote storage system (FIG. 3, 102) is a website, the directing device (202) may include the Universal Resource Locator (URL) of the website where the personalized information (FIG. 3, 104) is located. In another example, if the remote storage system (FIG. 3, 102) is a remote server, then the directing device (202) may include the Internet Protocol (IP) address of the server where the personalized information (FIG. 3, 104) is located.

According to one example, the directing device (202) may be a coded machine-readable optical message that may be read by any number of electronic devices. A coded message keeps information hidden to those parties who have not been granted access. Examples of machine-readable optical data include, but are not limited to barcodes, matrix bar codes, code embedded in an image, integrated computer chips, radio frequency chips, and magnetic strips. A coded message offers an additional level of security as the directing device (202) interacts with an electronic device. The directing device (202) may also direct the user (FIG. 3, 106) and the third parties (FIG. 3, 108a, 108b) to an intermediary site where the user or third party meets certain security measures to access the remote storage device (FIG. 3, 102).

As explained above, the directing device (202) may be located on a data card that the user (FIG. 3, 106) or third party (FIG. 3, 108a, 108b) may use to access the remote storage system (FIG. 3, 102) and corresponding personalized information (FIG. 3, 104). In this example, the identity of the data card holder may be anonymous. That is, access to the personalized information (FIG. 3, 104) is tied to the data card, and not the individual. Using a directing device (202) in this fashion increases security as the personalized information is not connected to the holder of the card, but rather to the card itself.

The linking system (110) may also include a reading device (204) that interprets the message from the directing device (202). According to one example, the reading device (202) decodes a coded message included in the directing device (202). With the message interpreted, the reading device (204) then directs the user (FIG. 3, 106) and third parties (FIG. 3, 108a, 108b) to the location of the personalized information (FIG. 3, 104) within the remote storage device (FIG. 3, 102). Examples of reading devices (204) include, but are not limited to, scanners, cameras, optical scanners, magnetic card readers, radio frequency scanners, integrated computer chips, proximity scanners, and barcode scanners. For example, a matrix bar code directing device (202) may be placed on a data card; a smart phone camera reading device (204) may then interpret the matrix bar code and direct the user to the location of the personalized information (FIG. 3, 104) within the remote storage system (FIG. 3, 102).

According to another example, an optical scanner reading device (204) at a retailer location may scan a standard barcode directing device (202) and then transfer the retailer employee to the personalized coupon located on the remote storage system.

The reading device (204) may be distinct from the directing device (202) to further increase the security of the personalized information (FIG. 3, 104). For example, if a data card with a barcode directing device (202) is lost, the personalized information may still have a degree of security as an individual may not read the coded message of the directing device. In addition, if the directing device (202) directs an entity to an intermediary site requiring a password to enter the remote storage system (FIG. 3, 102), the security of the personalized information (FIG. 3, 104) is further ensured.

The linking system (110) may also include a display device (206), communicatively coupled to the reading device (204) that allows the user (FIG. 3, 106) or third party (FIG. 3, 108a, 108b) to view at least a portion of the personalized information (FIG. 3, 104). Examples of display devices (206), include, but are not limited to, smart phone screens, computer monitors, personal computing device screens, LED display screens, and tablets.

According to one example, such display devices (206) may be portable such that the user (FIG. 3, 106) or third party (FIG. 3, 108a, 108b) may view the personalized information (FIG. 3, 104) from any location. For example, an individual user may use a smart phone display to view personalized prescription information. According to another example, the display device (204) may be stationary, such as a computer monitor at a retailer location. Using a display device (206) allows a large amount of information to be displayed easily and updated periodically. For example, spatial and practical concerns limit the amount of information that may be contained in paper retailer coupons. By comparison, an electronic viewer allows for much greater practical delivery of information.

According to an example, the display device (206) is distinct from the directing device (202). As explained above, this increases security as a lost directing device (202) does not permit an individual from viewing information without a display device (206). The inability to view the personalized information immediately further increases the security of the personalized information (FIG. 3, 104).

In the event the personalized information (FIG. 3, 104) has been encoded, the display device (206) may also decode the personalized information such that it may be viewed by the user (FIG. 3, 106) or third party (FIG. 3, 108a, 108b).

According to one example the linking system (110) may also include a writing device (208) which allows an entity to alter personalized information (FIG. 3, 104). For example, a doctor third party (FIG. 3, 108a) may be permitted to alter the medical records of an individual's personalized information (FIG. 3, 104). This ability to alter personalized information (FIG. 3, 104) may be granted after passing certain security measures such as entry of a password, or identification of approved electronic device. According to one example, the ability to alter the personalized information may be limited to certain portions of the personalized information. For example, a pharmacist may be able to alter the personalized information to indicate that a prescription has been filled.

According to one example, the writing device (208) may allow the entity to assign personalized information (FIG. 3, 104) to the directing device (202). For example, a doctor third party (108b) may write a prescription as personalized information to the remote storage system. Next, the doctor may use the writing device (208) to assign the website where the prescription is located to the directing device (202) of the linking system (110).

Figure 5A:
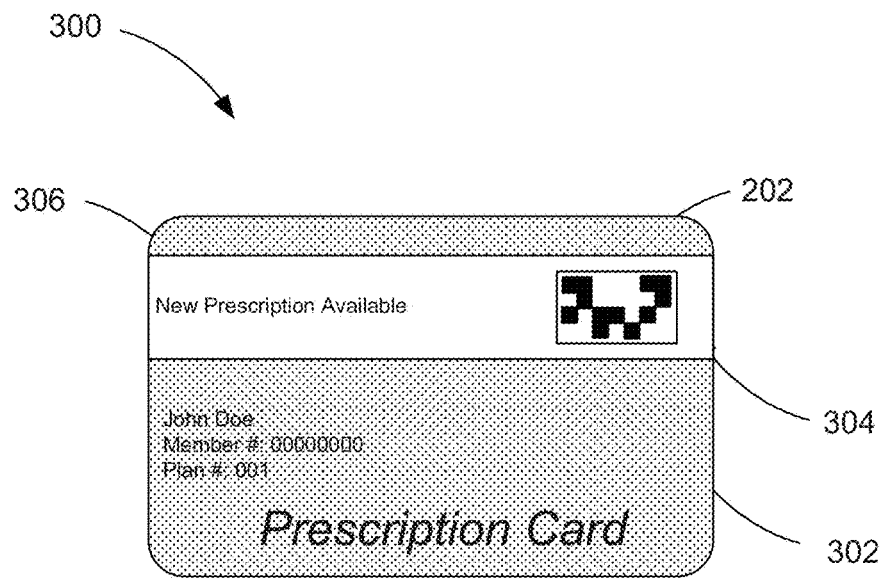
FIGS. 5a-5b are examples of data cards of a linking system, according to principles described herein.

FIG. 5a is an example of a data card (300) directing device. According to an example, the data card (300) may include a permanent printed portion (302) that contains information permanently transcribed to the data card (300). Examples of information that may be included on the permanent printed portion (302) include, but is not limited to, identification information of the card holder, identification information of the card issuer, and other information that is not updated. For example, a prescription data card may include the card holder's name, the card issuer's name, and insurance policy information.

The data card (300) may also include a variable display portion (304) that is rewriteable. According to one example, the variable display portion (304) is made of electronic paper which allows the information to be displayed indefinitely without electricity and may be later altered. Devices that may alter the variable display portion (304), include, but are not limited to an ion head beam, corona discharge, and other rewriteable methods. The variable display portion (304) may be covered by a standoff layer that prevents unauthorized entities from writing to the variable display portion (304). The variable display portion (304) may include an overt message (306) directed to the data card holder. Information may include any short message to be communicated to the data card holder. For example, the overt message (306) may indicate to an individual that a new prescription is available.

The variable display portion (304) may also include the directing device (202) that identifies to the reading device (FIG. 2, 204) the location of the personalized information (FIG. 3, 104). For simplicity, the directing device (202) of FIG. 5a is represented by a Matrix bar code; however, any directing device (202) may be used to identify the location of the personalized information (FIG. 3, 104).

Using a directing device (202) in this fashion separates the personalized information (FIG. 3, 104), located on the remote storage device (FIG. 3, 102), from the identity of the data card holder, thus ensuring the security of the personalized information (FIG. 3, 104) as well as the confidentiality of the data card holder. According to one example, the identity of the data card holder is not printed on the data card (300). This adds another level of confidentiality and security as the identity of the data card holder is nowhere disclosed. For example, a retailer issuing the data card (300) with a loaded coupon may issue cards to customers of its store without any identification information of the data card holder. Rather the data card holder simply presents the data card (300) with the corresponding coupon at the retailer location to redeem the coupon.

Including the directing device (202) on the variable display portion (304) of the data card (300) allows for changes to be made to the directing device (202). Changes to the directing device are generally made as the personalized information (FIG. 3, 104) is altered. For example, a doctor may make an alteration to a medical prescription of an individual. To reflect this change, the doctor, or other administrator, may create a new directing device (202) to direct the individual and other third parties to the location of the altered medical prescription.

Figure 5B:
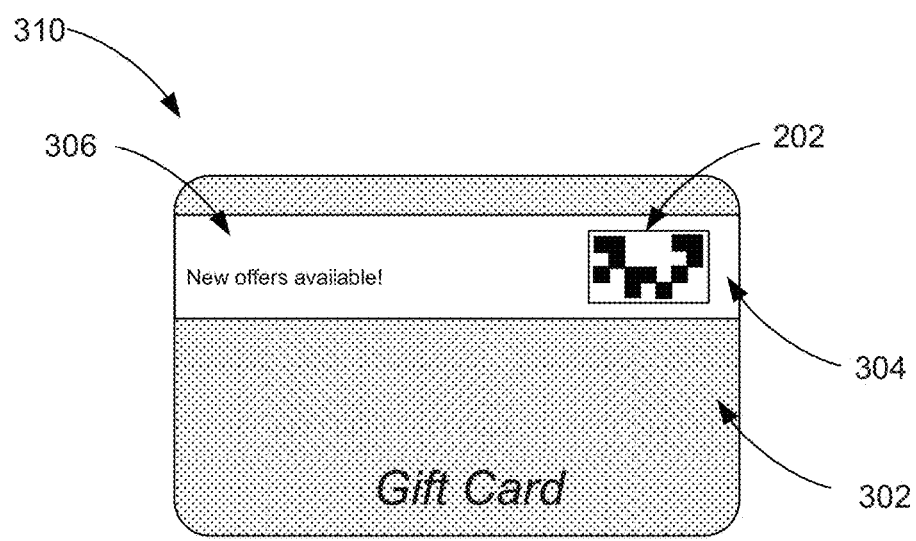

FIG. 5b is another example of a data card (310) directing device. In this example the personalized information referenced by the directing device (202) may pertain to a group of individuals that share a characteristic. For example, a retailer may issue a coupon to all holders of the card. In this example, the coupon may be stored on the remote storage system. As described above, the data card (310) may include a permanent printed portion (302) that contains information permanently transcribed to the data card (300). In this example, the printed portion (302) may include the card issuer's name as well as advertising material.

The data card (310) may also include a variable display portion (304) that is rewriteable. The variable display portion (304) may include an overt message (306) directed to the data card holder. In this example, the overt message (306) includes a short advertising message. The directing device (202) in this example, directs the data card holder and third parties to the retailer coupon located on the remote storage device (FIG. 3, 102)

Figure 6:
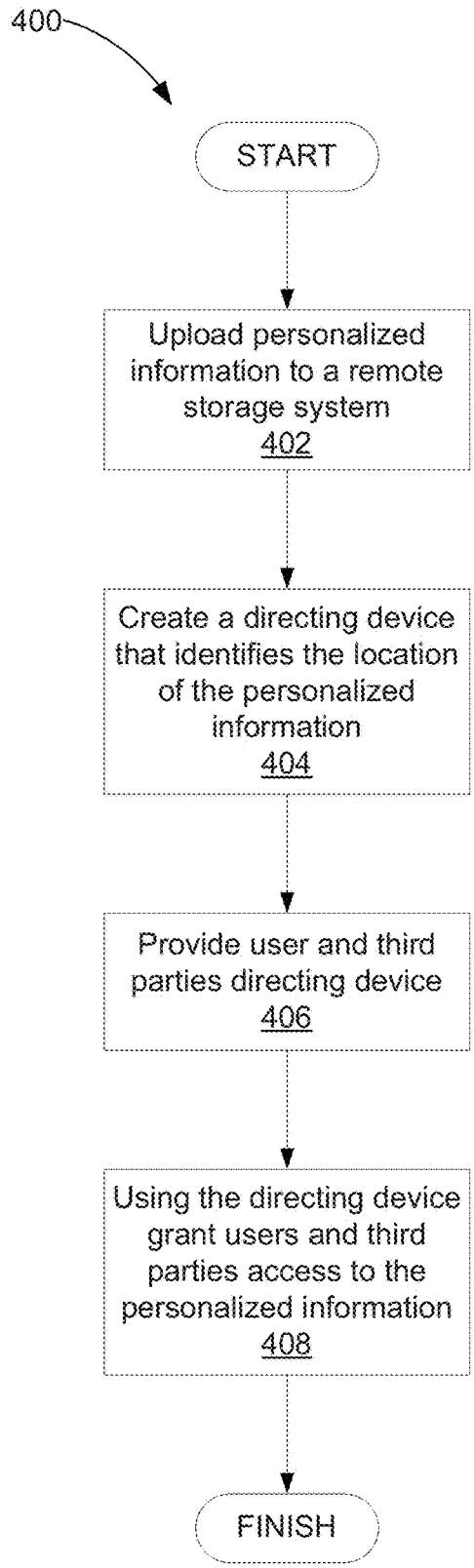
FIG. 6 is a flowchart showing a method for storing and accessing data located on a remote storage system, according to principles described herein.

FIG. 6 is a flowchart showing a method (400) for storing and accessing data located on a remote storage system. The method (400) may begin by uploading (402) personalized information relating to a user to a remote storage system. Next the method may include creating (404) a directing device that identifies the location of the personalized information. Examples of directing devices include, but are not limited to, barcodes, matrix bar codes, code embedded in an image, integrated computer chips, radio frequency chips, and magnetic strips. Next, the directing device is provided (406) to users and third parties so that they may access the personalized information. According to an example, the directing device may be located on a variable display portion of a data card. The term user refers to entities to whom the personalized information pertains, and third parties are those entities that have been approved to view the personalized information. Then, using the directing device, the method (400) directs (408) users and third parties to the personalized information, using any number of electronic devices.

Figure 7:
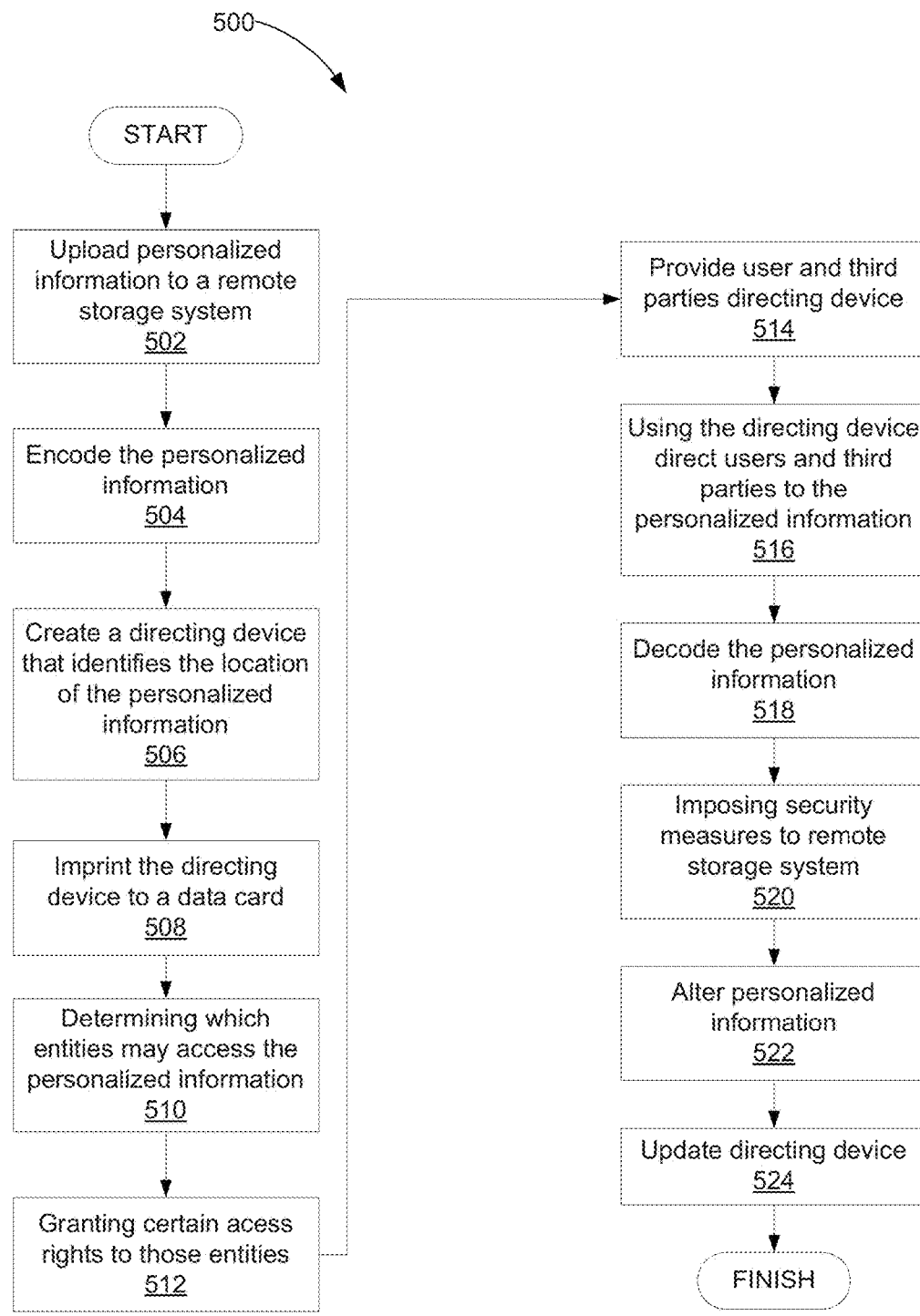
FIG. 7 is a flowchart showing a method for storing and accessing data located on a remote storage system, according to principles described herein.

FIG. 7 is a flowchart showing a method (500) for storing and accessing data located on a remote storage system. The method (500) may begin by uploading (502) personalized information relating to a user to a remote storage system. Next, the method (500) may include encoding (504) the personalized information. Then, a directing device is created (506) that identifies the location of the personalized information. According to an example, the method (500) may then include imprinting (508) the directing device to a data card. With the directing device in place, the method (500) continues by determining (510) which entities may access the personalized information, and granting (512) certain access rights to those entities. Then, the directing device may be provided (514) to the users and third parties so that they may access the personalized information. Then, using the directing device, the method (500) directs (516) users and third parties to the personalized information, using any number of electronic devices. If the personalized information was encoded, the method may also include decoding (518) the personalized information such that it may be viewed. Additionally, the method (500) may include imposing (520) security measures to ensure that those with permission may access the information; for example a password controlled entry, or limiting access to certain electronic devices. Last, if desired, the personalized information may be altered (522) to reflect changes in the personalized information and the corresponding directing device may be updated (524).

The preceding description has illustrated a system and method for accessing electronic data stored on a remote storage system. The method may upload personalized information relating to a user to a remote storage system and create a directing device that identifies the location of the personalized information. With the directing devices in the hands of users and third parties, the personalized information may be accessed. In an example, the directing device is a machine-readable optical code stored on a variable display portion of a data card. With the directing device, the method may then grant access to the personalized information. A system for implementing the method is also disclosed which includes a remote storage system that stores certain personalized information, a number of linking systems through which the users and third parties can access the personalized information, and an administrator who controls access to the personalized information.

As remote storage systems are used more often, the current method and system increase the security and confidentiality of assessing the information stored on those remote storage systems. By reducing the duplicity of information, separating user identity and the personalized information, and imposing other security measures, the method and system improve the ability to securely share information through a remote storage system. When the directing device is imprinted on a rewriteable variable display portion simple of a data card, the method and system also increases the efficiency of using remote storage systems as personalized information and the corresponding directing device may be continually altered and updated. As a result, the users and third parties can access updated information from a number of electronic devices.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer software product comprising a tangible non-transitory medium readable by a processor, the medium having stored thereon a set of instructions for causing a mobile computing device, the mobile computing device having an optical device, to securely access remotely stored data, the instructions comprising:
   (a) a set of instructions which, when loaded into a memory and executed by the processor, causes the mobile computing device to optically read an optical message that comprises a variable encoded on-line address being displayed on a variable display of a card sized to be carried by a user;
   (b) a set of instructions which, when loaded into a memory and executed by the processor, causes the mobile computing device to decode the optical message and request access to the remotely stored date using the decoded variable online address;
   (c) a set of instructions which, when loaded into a memory and executed by the processor, causes the mobile computing device to, upon the requested access being granted, load the remotely stored data to the mobile computing device; and
   (d) a set of instructions which, when loaded into a memory and executed by the processor, causes the mobile computing device to, update, through a standoff layer that covers the variable display to prevent unauthorized entities from writing to the variable display, the optical message being displayed on the variable display of the card by:
      receiving an alteration to the remotely stored data;
      assigning a new optical message to the altered remotely stored data to indicate a location of the altered remotely stored data; and
      controlling a writing device to apply an electric field over the variable display of the card to form the new optical message to indicate the location of the altered remotely stored data.

2. The product of claim 1, wherein the encoded on-line address is presented as an Image displayed on the variable display.

3. The product of claim 2, wherein the Image includes one of a bar code, matrix bar code and code embedded In an Image.

4. The product of claim 1, wherein the set of Instructions that causes the mobile computing device to request access to the remotely stored data further comprises instructions for receiving a password from a user of the mobile computing device and submitting the password to request access to the remotely stored data.

5. The product of claim 1, wherein the remotely stored data comprises advertising or a transactional offer for the user of the card.

6. The product of claim 1, wherein the variable display is rewriteable.

7. A method of performing a user related operation comprising:
   with an optical reader of a device, reading an optical message that comprises an encoded on-line address being displayed on a variable passive electronic paper display of a pocket-sized card to be carried by a user;
   with a processor of the device, decoding the an optical message that comprises an encoded on-line address being displayed on a variable passive electronic paper display of a pocket-sized card to be carried by a user;

with a processor of the device, decoding the optical message:

with the processor of the device, requesting access to remotely stored data using the online address, the remotely stored data being related to the user;

with the processor of the device 1 upon the requested access being granted, loading the remotely stored data to a computing device; and with the processor of the device, updating, through a standoff layer that covers the variable passive electronic paper display to prevent unauthorized entities from writing to the variable passive electronic paper display, the optical message being displayed on the variable passive electronic paper display by:

receiving an alteration to the remotely stored data;

assigning a new optical message to the altered remotely stored data to indicate a location of the altered remotely stored data; and controlling a writing device to apply an electric field over the variable display of the card to form the new optical message to indicate the location of the altered remotely stored data.

8. The method of claim 7, further comprising receiving a password from a user of the optical reader and submitting the password to request access to the remotely stored data.

9. The method of claim 7, further comprising updating the display of the card with information related to the user related operation.

10. The method of claim 7, wherein requesting access to the remotely stored data includes accessing a cloud service, whereby the cloud service can giant access to the remotely stored data.

11. The method of claim 7, wherein the card is a medical prescription card, the remotely stored data comprising information for a medical prescription to be dispensed to the user of the card, the user related operation including determining the medical prescription to be dispensed to the user of the card.

12. The method of claim 7, wherein the card is a transaction card, the remotely stored data comprising advertising or a transactional offer for the user of the card, the user related operation including determining the transactional offer for the user of the card.

13. The method of claim 7, wherein the optical reader is incorporated Into a mobile computing device and the mobile computing device performs the decoding, requesting remotely stored data and loading the remotely stored data.

14. The method of claim 7, wherein the optical reader is incorporated into a point-of-sale device and the remotely stored data is requested as part of a transaction at the point of-sale device being conducted by the user of the card.

15. The method of claim 7, wherein the pocket-sized card further comprises a magnetic strip for storing information, the method comprising reading Information on the magnetic strip of the card.

16. The method of claim 7, wherein the remotely stored data is a user's purchasing history.

17. A system for performing user related operations comprising:

a device that comprises:

an optical reader which reads a an optical message an optical message that comprises an encoded image being displayed on a variable display of a card;

a processor which:

executes Instructions to decode the optical message and request access to remotely stored data to execute an operation, wherein different levels of access are granted to different entities;

executes Instructions to receive an alteration to the remotely stored data;

executes Instructions to assign a new optical message to the altered remotely stored data to indicate a location of the altered remotely stored data; and executes instructions to control a writing device to apply an electric field over the variable display of the card to form the new optical message to indicate the location of the altered remotely stored data; and the writing device which updates, through a standoff layer that covers the variable display to prevent unauthorized entities from writing to the variable display, the optical message being displayed on the variable display of the card.

18. The system of claim 17, wherein the operation is associated to a medical prescription; and the remotely stored data comprises information for a medical prescription to be dispensed to the user of the card.

19. The system of claim 17, further comprising a user interface for entering a password associated with the transaction information stored in the remote system, wherein the client communication engine uses the password with the access related data to access the information related to the transaction on the remote system.

20. The system of claim 17, wherein said image comprises one of a bar code and a matrix bar code.

* * * * *

UNITED STATES PATENT AND TRADEMARK OFFICE
CERTIFICATE OF CORRECTION

PATENT NO. : 9,846,874 B2  
APPLICATION NO. : 13/455426  
DATED : December 19, 2017  
INVENTOR(S) : Napoleon J. Leoni et al.

Page 1 of 1

It is certified that error appears in the above-identified patent and that said Letters Patent is hereby corrected as shown below:

In the Claims

In Column 13, Line 47, in Claim 13, delete "Into" and insert -- into --, therefor.

In Column 14, Line 15 approx., in Claim 17, delete "a an" and insert -- an --, therefor.

Signed and Sealed this  
Third Day of April, 2018

Andrei Iancu  
*Director of the United States Patent and Trademark Office*